(12) United States Patent
Krumpe

(10) Patent No.: US 9,556,686 B1
(45) Date of Patent: Jan. 31, 2017

(54) WET-MATEABLE CONNECTOR UNIT WITH GAS PRESSURE RELIEF

(71) Applicant: Teledyne Instruments, Inc., Thousand Oaks, CA (US)

(72) Inventor: Andrew Krumpe, Lee, NH (US)

(73) Assignee: Teledyne Instruments, Inc., Thousand Oaks, CA (US)

( * ) Notice: Subject to any disclaimer, the term of this patent is extended or adjusted under 35 U.S.C. 154(b) by 0 days.

(21) Appl. No.: 15/002,167

(22) Filed: Jan. 20, 2016

(51) Int. Cl.
   *H01R 13/52* (2006.01)
   *E21B 17/02* (2006.01)
   *E21B 34/08* (2006.01)
   *H01R 13/523* (2006.01)

(52) U.S. Cl.
   CPC ........... *E21B 17/023* (2013.01); *E21B 17/028* (2013.01); *E21B 34/08* (2013.01); *H01R 13/523* (2013.01)

(58) Field of Classification Search
   CPC ..... H01R 13/523; H01R 13/00; E21B 17/023; E21B 17/028; E21B 34/08
   See application file for complete search history.

(56) References Cited

U.S. PATENT DOCUMENTS

| 2,032,325 | A | 2/1936 | Laird | |
| 9,028,264 | B2 * | 5/2015 | Head | H01R 13/00 439/140 |
| 9,270,051 | B1 * | 2/2016 | Christiansen | H01R 13/523 |
| 9,391,392 | B2 * | 7/2016 | Ranalli | H01R 13/523 |
| 2014/0030904 | A1 | 1/2014 | Head | |

FOREIGN PATENT DOCUMENTS

EP    0307965    3/1989

OTHER PUBLICATIONS

The Lee Company, Forward Screened 187 Zero Leak Chek, 2011, Westbrook, CT.

* cited by examiner

*Primary Examiner* — Jean F Duverne
(74) *Attorney, Agent, or Firm* — Procopio, Cory, Hargreaves & Savitch, LLP

(57) ABSTRACT

A wet-mateable connector unit for use in vertical or substantially vertical orientation in a subsea gas well has an outer shell and a movable wall inside the shell surrounding a pressure compensated chamber containing dielectric fluid. The chamber wall is exposed to ambient pressure outside the connector unit. At least one relief valve is mounted in the connector unit and has an inlet in communication with the upper end of the chamber and an outlet in communication with the external environment surrounding the connector unit. The relief valve opens to release gas from the upper end of the chamber when the differential pressure between the chamber and external environment exceeds a predetermined valve cracking pressure. A plurality of relief valves may be provided.

10 Claims, 4 Drawing Sheets

WET-MATEABLE CONNECTOR UNIT WITH GAS PRESSURE RELIEF

BACKGROUND

1. Field of the Invention

The present invention relates generally to connector assemblies having releasably mateable plug and receptacle units designed for use underwater or in other hostile environments, and is particularly concerned with a connector unit and method for downhole connectors exposed to gas for extended periods of time.

2. Related Art

There are many types of connectors for making electrical and fiber-optic cable connections in harsh environments, such as underwater or subsea electrical, optical and hybrid electrical and optical connectors which can be repeatedly mated and de-mated underwater at great ocean depths. These connectors typically consist of releasably mateable connector units or plug and receptacle units, each attached to cables or other devices intended to be joined by the connectors to form completed circuits. Each connector unit contains one or more electrical and/or optical contacts or junctions for engagement with the junctions in the other unit when the two units are mated together. To completely isolate the contacts to be joined from the ambient environment, one or both connector units house the contacts in fluid-filled, pressure-compensated chambers. The fluid may be a dielectric fluid or oil in the case of an electrical connector. The dielectric fluid is typically pressure compensated by means of a movable or flexible member, such as a piston or a flexible bladder, forming a wall of the dielectric chamber.

In oil and gas well connector applications, the plug and receptacle units of wet-mateable downhole electrical connectors are mated and de-mated at a point downhole or subsea in order to releasably connect power or signal to downhole equipment such as pumps, sensors, or the like, with the connector units oriented vertically or at an angle. One of the connector units is connected to the downhole equipment while the other connector unit is at the end of a power supply or signal communication cable. In gas well applications where the connector is exposed to gas for extended durations, the gas can permeate through the flexible bladder or the piston seals of the dielectric chamber and dissolve in the dielectric fluid. If the ambient pressure is reduced at a sufficiently high rate, the dissolved gas can come out of solution and expand. This expansion causes an increase in internal pressure in the connector, which can exceed the design limits of the pressure compensation devices such as pistons or bladders, potentially causing failure of those devices and thus electrical or optical failure of the whole connector.

SUMMARY

Apparatus and methods are described for relief of increased internal pressure in a pressure compensated fluid chamber of a wet mateable connector unit which arises due to dissolved gas coming out of solution when ambient pressure is reduced.

In one aspect, a connector unit comprising one part of a wet-mateable connector comprises an outer shell having an upper end and a lower end when installed downhole in a subsea gas well, a pressure compensated chamber inside the connector unit containing a fluid, a space between the pressure compensated chamber and the shell, the shell having at least one opening communicating with the space, the chamber having an upper end, a lower end, and an outer flexible or movable wall exposed to ambient pressure in the space between the outer wall and shell, at least one pressure relief valve mounted in the shell with an inlet communicating with the upper end of the chamber and an outlet, the valve outlet communicating with the external environment, the pressure relief valve having a predetermined cracking pressure and being configured to open and release previously dissolved gas which has come out of solution from the upper end of the chamber when internal pressure in the chamber exceeds the predetermined cracking pressure. The fluid may be dielectric oil or the like if the connector unit is part of a wet-mateable electrical or hybrid electro-optical connector, and may be an optical fluid if the connector unit is part of a wet-mateable optical or electro-optical connector.

In one aspect, the pressure relief valve extends through the chamber wall in direct communication with the upper end of the chamber and the valve outlet communicates with the space surrounding the chamber wall. In another aspect, one or more pressure relief valves are mounted in an upper connector portion or fitting of the connector unit.

Other features and advantages of the present invention should be apparent from the following description which illustrates, by way of example, aspects of the invention.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

Certain embodiments as disclosed herein provide for pressure relief of expanding gas in the pressure compensated dielectric fluid within a downhole wet mateable electrical plug or connector unit.

After reading this description it will become apparent to one skilled in the art how to implement the invention in various alternative embodiments and alternative applications. However, although various embodiments of the present invention will be described herein, it is understood that these embodiments are presented by way of example only, and not limitation. As such, this detailed description of various alternative embodiments should not be construed to limit the scope or breadth of the present invention.

Figure 1:
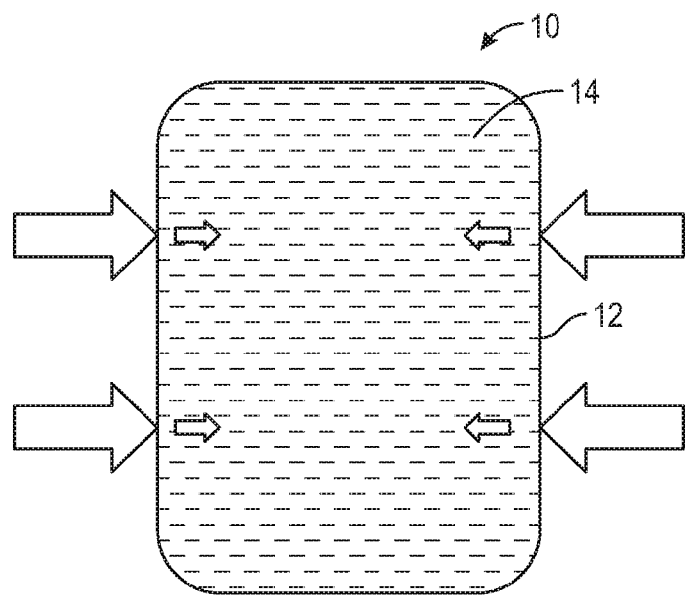
FIG. 1 is a schematic view of an elastomeric bladder or chamber containing pressure compensation fluid, as typically used in wet-mateable connectors.

FIG. 1 is a schematic illustration of a pressure compensation chamber 10 as typically provided in wet-mateable connector units for housing the electrical or optical contacts for subsea mating engagement with corresponding contacts in a mating connector unit. Such chambers are pressure compensated by movable member, such as a piston, bellows, or an elastomeric wall. FIG. 1 illustrates elastomeric wall 12 containing a volume of fluid 14 such as dielectric oil. The wall 12 is exposed to the external environment via one or more ports in the connector unit communicating with the space outside the chamber. Since the fluid 14 is nearly incompressible, changes in the surrounding ambient pressure causes little or no movement in the wall. In applications such as downhole wells, the connector may be exposed to gas for extended periods of time, and gas can permeate through the bladder or associated hose or O-rings in the direction of the arrows and dissolve into the fluid or liquid in the chamber. If ambient pressure reduces, the dissolved gas comes out of solution and rises to the top of chamber 10, forming a volume 15 of gas at the top of the chamber, as illustrated schematically in FIG. 2. Since permeation back out through the elastomer is a slow process, the hose or bladder will expand. The expansion of gas inside the pressure compensation chamber increases internal pressure in the chamber, which can exceed the design limits of the pressure compensation chamber in some cases and cause failure of those elements, and thus electrical or optical failure of the entire connector.

Figure 2:
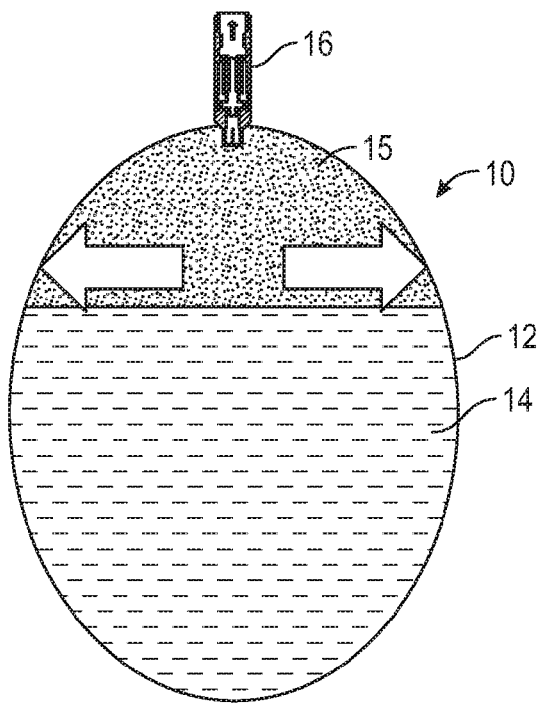
FIG. 2 is a schematic view illustrating dissolution of the dissolved gas from the dielectric fluid, and operation of a check valve or pressure relief valve located in the top of the chamber in one embodiment which allows gas to escape from the chamber when the internal pressure exceeds a predetermined value.
Figure 3:
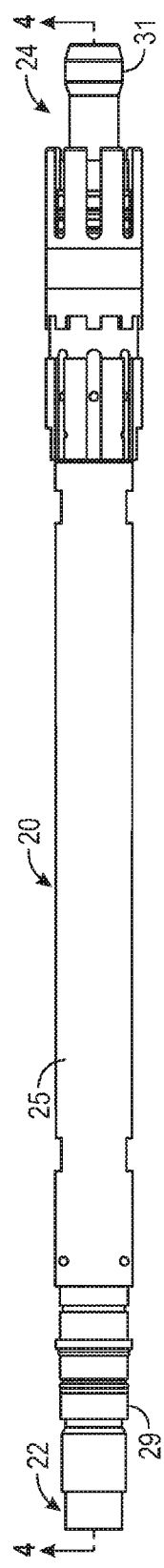
FIG. 3 is a side elevation view of one embodiment a plug unit of a wet-mateable connector for installation downhole in a subsea gas well in an upright or substantially vertical or inclined orientation.

FIG. 2 is a schematic illustration of one embodiment of a pressure compensation chamber 15 including a pressure relief valve 16 at an upper end portion of the chamber. Valve 16 has a selected cracking pressure significantly lower than the design limit pressure for the pressure compensation chamber 15, so that it opens when pressure in volume 15 exceeds the cracking pressure, allowing gas to vent from volume 15 through the open valve and into the surrounding space or environment, as described in more detail below in connection with the embodiment of FIGS. 3 to 8. The check valve allows the expanding gas to pass to the environment, avoiding damage to the hose or bladder or other components of the plug unit.

The check valve or pressure relief valve 16 may be mounted at any suitable location in a connector unit with its inlet end exposed to pressure in the upper end region 15 of the chamber. In one embodiment, the valve 16 may be mounted to extend through the elastomeric chamber wall 12 at the upper end of the chamber, as indicated schematically in FIG. 2. In alternative embodiments, the valve may be mounted in an upper connector portion of the plug or connector unit, with a passageway from the upper end of the pressure compensation chamber to a first end or inlet of the valve, and the second end or inlet of the valve communicating with the external environment via a suitable exhaust passageway. FIGS. 3 to 8 illustrate one embodiment of the second alternative.

As noted above, FIGS. 3 to 8 illustrate an embodiment of a gas tolerant downhole or wet mateable connector unit or plug unit 20 comprising one part of a wet mateable connector. Plug unit 20 is modified to incorporate a pressure relief valve assembly 40 in an upper end or upper connector portion of the plug unit, as described in more detail below with reference to FIGS. 4 to 8. Plug unit 20 is vertically oriented or substantially vertically oriented in use and has an upper end 22 for connection to a jumper assembly and a lower end 24 for releasable mating engagement with a corresponding receptacle unit of a wet-mateable connector or feedthrough system for high pressure/high temperature subsea wellhead installations. In the illustrated embodiment, the plug unit is one part of a single pin, wet-mateable electrical connector or feedthrough, such as the Electrical Feedthrough System for vertical subsea wellhead completions manufactured by Teledyne DGO of Portsmouth, N.H., but other wellhead plug or connector units with one pin or multiple pins may include a similar relief valve assembly in alternative embodiments.

Figure 4:
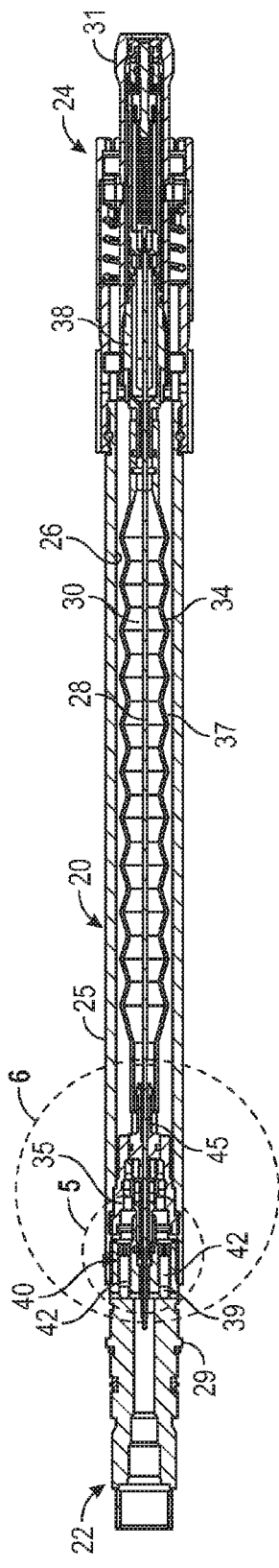
FIG. 4 is longitudinal cross-sectional view of the plug unit on the lines 4-4 of FIG. 3.
Figure 6:
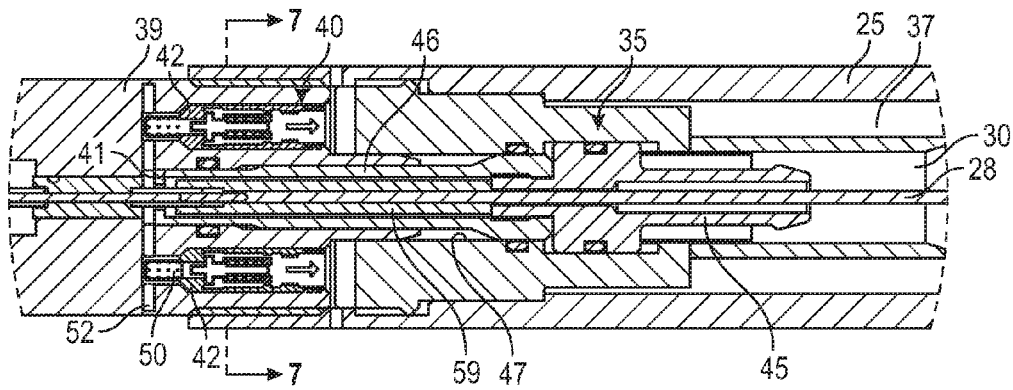
FIG. 6 is an enlarged cross-sectional view of the circled area 6 of FIG. 4, illustrating the flow path of gas from an upper portion of the pressure compensation chamber to one end of the valves of the pressure relief assembly.

The plug unit 20 has upper and lower ends 22, 24 and an outer shell 25 having a through bore 26. A pressure compensated dielectric chamber 30 extends inside the shell between an upper connector portion and a lower connector portion of the plug unit. In one embodiment, the lower connector portion includes end fitting or guide 38 secured to the lower end of the chamber and contact socket member 31 extending from fitting 38 out of the lower end of shell 25. Contact socket member 31 is designed for releasable mating engagement with a corresponding pin assembly of the mating connector or receptacle unit (not illustrated), as is known in the field. In one embodiment, the upper connector portion includes an electrical penetrator 29 located at an upper end of the shell with an end wall 39 sealably engaged in the upper end of the shell, a tubular insulating member or sleeve 46 extending through bore 41 in end wall 39 and into an aligned bore 47 in an end fitting 35, and a guide stem 45 engaged with sleeve 46. The dielectric chamber 30 is pressure compensated by means of a movable or flexible surrounding wall 34 extending between end fitting or guide stem 45 of the upper connector portion and end fitting 38 of the lower connector portion, as illustrated in FIG. 4. A space 37 surrounding the flexible wall 34 is vented to the external environment via ports (not illustrated) in shell 25 so that wall 34 is free to move inwards or outwards with any volume changes due to variations in the surrounding pressure and temperature. In the illustrated embodiment, wall 34 is a metal bellows with elastomeric O-ring seals at each end of the bellows where it is connected to adjacent plug stems or components, as best illustrated in FIG. 6. In an alternative embodiment, the metal bellows and O-ring seals may be replaced with a flexible bladder.

Figure 5:
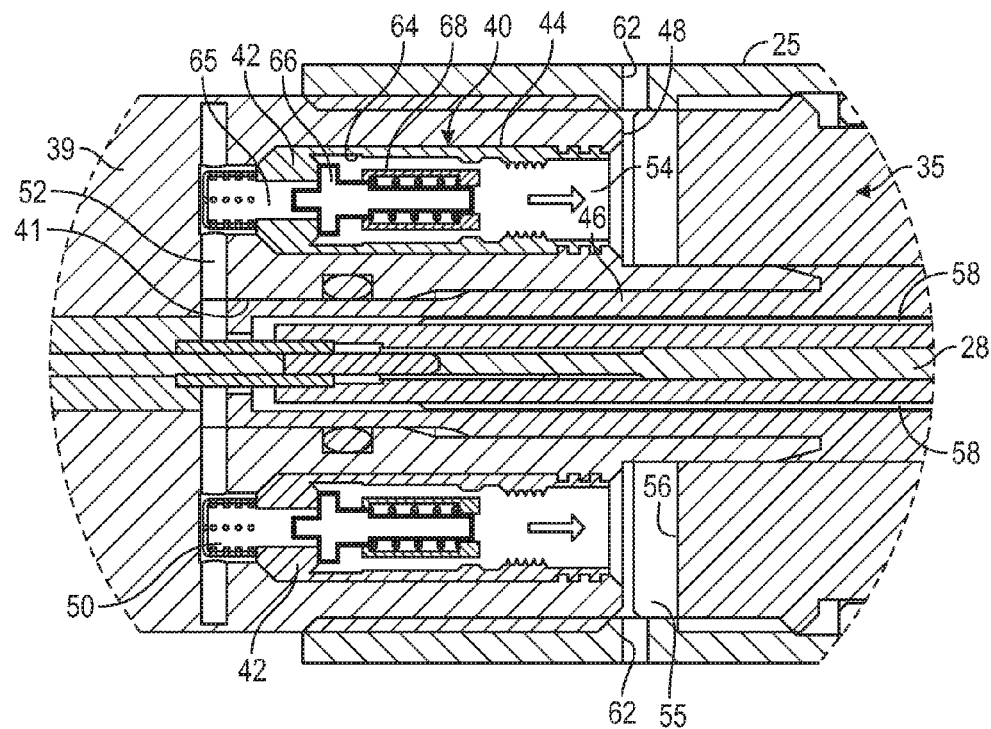
FIG. 5 is an enlarged cross sectional view of the circled area 5 of the upper portion of the plug unit in FIG. 4, illustrating one embodiment of a pressure relief assembly incorporated in an upper end portion of the plug unit.

In one embodiment, a pressure relief valve assembly 40 is mounted in the upper end portion of the connector unit in order to vent gas from the upper end of the chamber when a cracking pressure is exceeded, as described in more detail below with reference to FIGS. 5 to 8. In the illustrated embodiment, the upper connector portion of the plug unit is modified to incorporate pressure relief valve assembly 40 as well as passageways providing communication between the upper end of chamber 30 and a first end of the valve assembly and between a second end of the valve assembly and the external environment. As illustrated in FIGS. 4 to 6, conductor 28 extends from contact socket assembly 31 at the lower end of the plug unit, through end fitting 38 into chamber 30, and out of the upper end of the chamber through guide stem 45 and aligned tubular insulating member or sleeve 46 to for suitable connection to a conducting pin sealed inside penetrator 29. The upper end of penetrator 29 then connects to a wire harness assembly (not illustrated).

Figure 7:
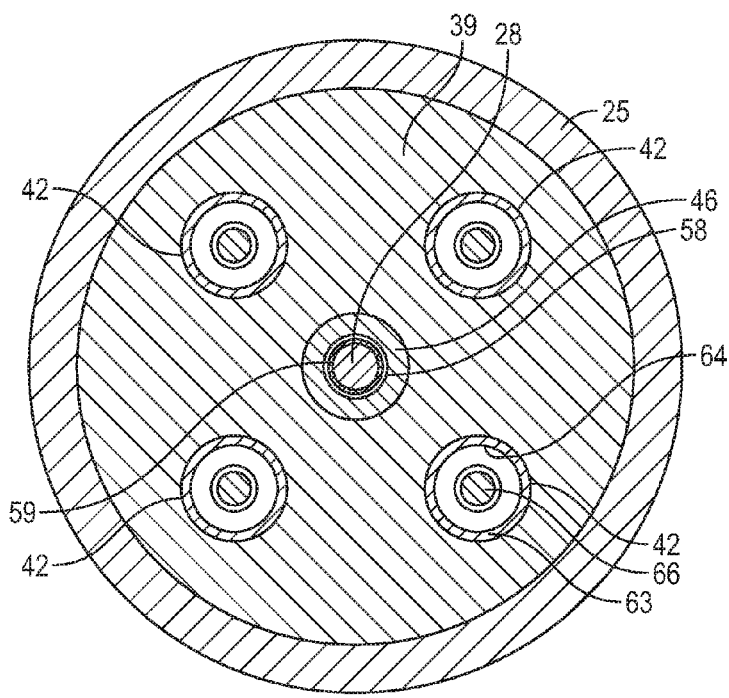
FIG. 7 is an enlarged cross-sectional view on the lines 7-7 of FIG. 6, illustrating the multiple valve arrangement.
Figure 8:
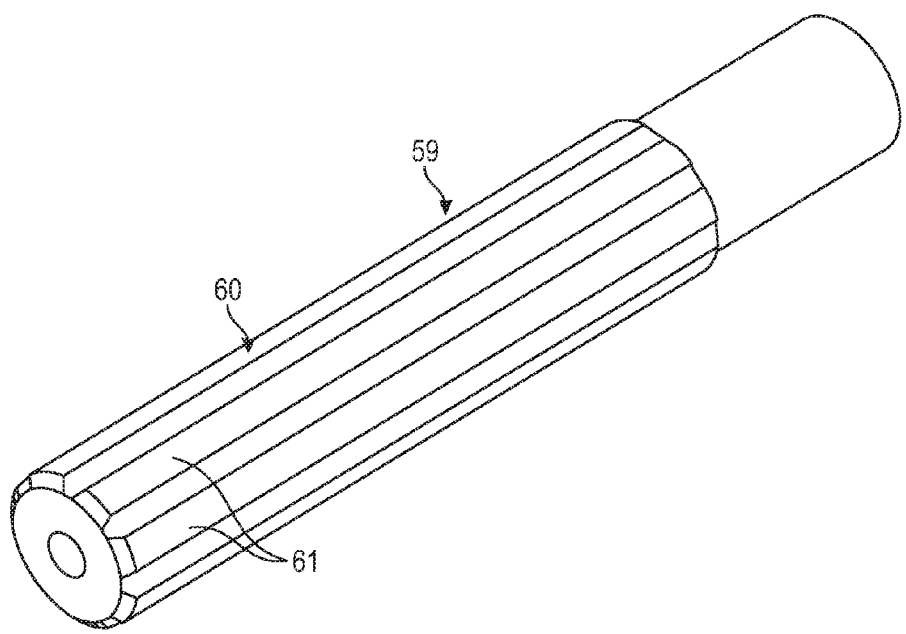
FIG. 8 is a perspective view of a fluted boot seal forming part of the pressure relief assembly.

In one embodiment, one or more pressure relief valves 42 are mounted in a series of equally spaced, parallel valve mounting bores 44 extending inwards from an inner end 48 of end wall 39. In the illustrated embodiment, there are four equally spaced valves 42, as best illustrated in FIG. 7, but a greater or lesser number of valves may be provided in alternative embodiments. Valves 42 may be miniature commercial off the shelf (COTS) valves with a low cracking pressure in the range from 1-20 psid (pounds per square inch differential). In one embodiment, valves 42 were CSRA1875005A zero leak check valves manufactured by The Lee Company of Westbrook, Conn., which have a diameter of 0.187 inches and a cracking pressure of 5+/−3 psid, but other similar COTS valves may be used in alternative embodiments. These valves are provided in either forward or reverse flow directions, and the valves in the illustrated embodiment have a reverse flow direction. This means that fluid flow through the valve is opposite to the valve installation direction, and the flow direction is shown by the arrows in FIG. 5. The choice of forward or reverse flow valves depends primarily on the direction of insertion during valve installation.

As best illustrated in FIGS. 5 and 7, each valve 42 is sealed in a respective bore 44 with inlet end 50 communicating with annular chamber or radial passageways 52 formed at the inner ends of bores 44 (see FIG. 5) and outlet end 54 communicating with space or gap 55 between the inner end 48 of end wall 39 and outer end face 56 of end fitting or mandrel 35. Annular chamber or passageways 52 communicate with the top of the pressure compensated volume or chamber 30 via an annular space 58 which extends axially around the boot seal 59 and conductor 28. Boot seal 59 which surrounds conductor 28 at the inner ends of annular space 58 is illustrated in more detail in FIG. 8, and has a fluted portion 60. The difference between the inner diameter of guide stem 45 and outer diameter of conductor 28 up to boot seal 59 is sufficient to allow gas to flow between these parts and between flutes 61 of boot seal 59 into space 58 to annular chamber 52, exposing the first ends 50 of valves 42 to pressure within the upper end of chamber 30. Space 55 at the second ends 54 of valves 42 communicates with the external environment via one or more ports 62 in shell 25.

Each valve 42 has a tubular wall 63 with through bore 64 which has a smaller diameter inlet end opening 65, and a valve seat 66 which is mounted in bore 64 and is biased by spring 68 into sealing engagement with opening 65 when end 50 is exposed to pressures below the valve cracking pressure. As gas pressure builds up in the upper end of chamber 30, it travels to the left via passageways 58, then radially outward in chamber 52 to the inlet ends 50 of the check valves. Once the cracking pressure is exceeded, the valves open and gas travels through the valve bores into space 55 and is vented radially outward via ports 62 to the external environment.

Chamber 30 is typically filled with a suitable dielectric fluid or oil. In applications where the connector is exposed to gas for extended periods of time, such as in a downhole gas well installation, gas permeates through the chamber wall 34 in the case of a resilient bladder or through the elastomeric seals of the piston or metal bellows and dissolves in the dielectric fluid. If the ambient pressure of gas surrounding the plug unit and permeating the space outside chamber 30 is reduced, the dissolved gas inside the chamber expands and may come out of solution. As dissolved gas expands due to decreasing ambient (compensated) pressure, it fills and expands the pressure compensated volume inside the chamber. Since the gas is less dense than dielectric fluid, it rises to the top of the chamber 30 to form a gas filled space as described above in connection with FIG. 2. The expansion of gas inside the pressure compensation chamber causes an increase in the internal pressure, which if unchecked can exceed the design limits of pressure compensation devices such as pistons, bladders, or bellows seals, causing failure of those devices and thus electrical or optical failure of the entire connector. Where the chamber wall is a flexible bladder, the bladder may burst due to a higher pressure differential than the bladder can withstand. In the case of a metal bellows, the end seals may fail and allow dielectric fluid to flow out of the chamber. The pressure relief valve assembly 35 of FIGS. 4 to 7 reduces or eliminates the risk of device failure due to excess pressure inside the pressure compensation chamber.

In the illustrated embodiment, check valves 42 are exposed to gas pressure in the pressure compensation chamber via gas escaping from the chamber through the passageways extending from the upper end of the chamber to the annular chamber or radial passages 52. When this pressure exceeds the check valve cracking pressure, the miniature pressure relief valves 42 open, releasing gas which has risen to the top of the chamber and into space 52 through the valve passageway 64 to outlet 54 and into space 55, where it is vented via ports 62 to the external environment. Since the valve cracking pressure is selected to be significantly lower than the design limit of the pressure compensation chamber, the risk of overpressure and potential failure of the connector is significantly reduced. Elastomeric bladders of wet-mateable connectors have been shown to safely withstand pressure differentials of greater than 200 psid, and the elastomeric O-ring seals at each end of a metal bellows may withstand even higher pressures. In some embodiments valves 42 have a cracking pressure in the range from 1 to 20 psid and therefore open at significantly lower pressure than the design limit of the pressure compensation chamber. In these embodiments, gas is allowed to exit the chamber long before a pressure differential in the vicinity of 200 psid is reached. In some embodiments, a filter screen or membrane at the inlet end of each valve may limit the amount of dielectric fluid exiting the chamber through the relief valves 26.

In the above embodiment, relief valves 42 act to relieve overpressure in the bladders chamber 30 due to expanding gas in the volume of dielectric fluid in chamber 30, reducing the risk of failure of the bladder and associated components. In an alternative embodiment, one or more pressure relief valves 16 may be mounted to extend through the wall 12 of a pressure compensation chamber itself, close to the upper end of the chamber, as illustrated schematically in FIG. 2. In this alternative, gas escapes from the chamber through the valve and into the surrounding space in the plug shell which is in communication with the external environment.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly limited by nothing other than the appended claims.

What is claimed is:

1. A connector unit of a wet-mateable connector adapted for use in a subsea gas well, the connector unit comprising:
    an outer shell having a through bore, an upper end portion and a lower end portion;
    an upper connector portion in the upper end portion of the shell and a lower connector portion in the lower end portion of the shell;
    a pressure compensated chamber in the shell through bore and extending between the upper and lower connector portions, the pressure compensated chamber having an upper end, a lower end, and an outer movable wall spaced from the outer shell and exposed to ambient pressure in a space between the pressure compensated chamber and the shell;
    the shell having at least one opening communicating with the external environment;
    one or more conductors extending from the upper connector portion through the pressure compensated chamber to the lower connector portion; and
    at least one pressure relief valve mounted inside the outer shell at a location in communication with the upper end of the chamber and having an inlet exposed to gas at the upper end of the chamber and an outlet in communication with the opening exposed to the external environment;
    the at least one pressure relief valve having a predetermined cracking pressure lower than a design pressure limit of the pressure compensated chamber and being configured to open and release gas from the upper end of the chamber when the inlet is exposed to pressure exceeding the predetermined cracking pressure.

2. The connector unit of claim 1, wherein the movable wall comprises a flexible bladder.

3. The connector unit of claim 1, wherein the movable wall comprises a metal bellows.

4. The connector unit of claim 1, wherein the at least one pressure relief valve extends through the flexible wall.

5. The connector unit of claim 1, wherein the at least one pressure relief valve comprises a plurality of pressure relief valves.

6. The connector unit of claim 1, wherein the at least one pressure relief valve is mounted in the upper connector portion, the upper connector portion having a first space communicating with a first end of the valve and a second space communicating with a second end of the valve, at least one passageway extending from the upper end of the chamber to the first space to expose the first end of the valve to gas pressure in the chamber and the second space being vented to the external environment.

7. The connector unit of claim 6, further comprising a plurality of spaced pressure relief valves mounted in the upper connector portion with first ends communicating with the first space and second ends in communication with the external environment via the second space.

8. The connector unit of claim 7, wherein four equally spaced pressure relief valves are mounted in the upper connector portion.

9. The connector unit of claim 1, wherein the relief valve has a cracking pressure in the range from 1 to 20 psid (pounds per square inch differential).

10. The connector unit of claim 9, wherein the relief valve has a cracking pressure in the range from about 2 to about 8 psid.

* * * * *